US011448120B2

(12) United States Patent
Jang et al.

(10) Patent No.: US 11,448,120 B2
(45) Date of Patent: Sep. 20, 2022

(54) GAS HEAT-PUMP SYSTEM

(71) Applicant: LG ELECTRONICS INC., Seoul (KR)

(72) Inventors: Heejoong Jang, Seoul (KR); Hojong Jeong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 89 days.

(21) Appl. No.: 17/123,447

(22) Filed: Dec. 16, 2020

(65) Prior Publication Data

US 2021/0180510 A1 Jun. 17, 2021

(30) Foreign Application Priority Data

Dec. 16, 2019 (KR) .................. 10-2019-0168126

(51) Int. Cl.
| | | |
|---|---|---|
| F02B 37/04 | (2006.01) | |
| F01N 3/02 | (2006.01) | |
| F01N 5/02 | (2006.01) | |
| F02B 29/04 | (2006.01) | |
| F02B 37/12 | (2006.01) | |
| F02D 41/00 | (2006.01) | |

(52) U.S. Cl.
CPC ............ *F02B 37/04* (2013.01); *F01N 3/0205* (2013.01); *F01N 5/02* (2013.01); *F02B 29/0462* (2013.01); *F02B 37/12* (2013.01); *F02D 41/0007* (2013.01); *F01N 2240/02* (2013.01); *F01N 2410/00* (2013.01); *F05D 2220/32* (2013.01); *F05D 2220/40* (2013.01); *F25B 2327/001* (2013.01)

(58) Field of Classification Search
CPC ...... F01N 3/0205; F01N 5/02; F01N 2240/02; F01N 2410/00; F02B 29/0462; F02B 37/04; F02B 37/12; F02B 37/18; F02B 37/183; F02B 33/40; F02B 39/10; F05D 2220/32; F05D 2220/40; F25B 2327/001; F25B 2313/023; F25B 2313/0232; F25B 2313/0234; F25B 13/00; F25B 27/02; F25B 25/02; F02D 41/0007; F02D 41/0027; F02D 41/0052; F02D 41/0072; F02D 41/0077; F02D 23/005; F02D 2200/001; Y02A 30/274; Y02B 30/52; Y02T 10/12; Y02T 10/40; F02M 26/13; F02M 26/34
See application file for complete search history.

(56) References Cited

U.S. PATENT DOCUMENTS

| | | | | |
|---|---|---|---|---|
| 9,074,492 | B2* | 7/2015 | Uzkan | .................... F02M 26/22 |
| 9,797,343 | B2* | 10/2017 | Surnilla | .............. F02D 41/0072 |
| 10,124,647 | B2* | 11/2018 | Bidner | ................ F02B 29/0443 |
| 2018/0038296 | A1* | 2/2018 | Choi | ...................... F02M 26/04 |

FOREIGN PATENT DOCUMENTS

KR 10-2018-0015900 2/2018

* cited by examiner

*Primary Examiner* — Audrey B. Walter
*Assistant Examiner* — Dapinder Singh
(74) *Attorney, Agent, or Firm* — KED & Associates (57) ABSTRACT

Proposed is a gas heat-pump system capable of supplying recirculation exhaust gas to an engine using an exhaust gas turbocharger and thus actively controlling an amount of the flowing recirculation exhaust gas and pressure thereof.

14 Claims, 6 Drawing Sheets

GAS HEAT-PUMP SYSTEM

CROSS REFERENCE TO RELATED APPLICATION

The present application claims priority to Korean Patent Application No. 10-2019-0168126, filed Dec. 16, 2019, the entire contents of which is incorporated herein for all purposes by this reference.

BACKGROUND OF THE INVENTION

Field of the Invention

The present disclosure relates to a gas heat-pump system and, more particularly, to a gas heat-pump system capable of supplying recirculation exhaust gas to an engine using an exhaust gas turbocharger and thus actively controlling an amount of the flowing recirculation exhaust gas and pressure thereof.

Description of the Related Art

A heat-pump system is a system that is capable of performing a cooling or heating operation through refrigeration cycle, and operates in cooperation with a hot water supply apparatus or a cooling and heating apparatus.

That is, hot water is produced or air conditioning for cooling and heating is performed using a heat source that is obtained as a result of heat exchange occurring between cooling refrigerant in the refrigeration cycle and a predetermined heat storage medium.

Generally, a configuration for the refrigeration cycle requires that a compressor compressing refrigerant, a condenser condensing the refrigerant compressed by the compressor, an expansion device decompressing the refrigerant condensed by the condenser, and an evaporator evaporating the decompressed refrigerant are included.

The heat-pump systems are categorized into electric heat-pump systems and gas heat-pump systems according to a type of drive source for driving the compressor.

The electric heat-pump systems, which have a low load capacity, are suitable for family use.

The gas heat-pump systems, which have a high load capacity, are suitable for industrial use or for large buildings.

Therefore, instead of an electric motor, the gas heat-pump system uses a gas engine in order to drive a high capacity compressor suitable for this high load capacity.

The gas heat-pump system is configured to include an engine that burns a mixture of gaseous and air and (hereinafter referred to as a "fuel-to-air mixture") and thus generates a motive force, a fuel supply device, a mixer for mixing air and gaseous fuel, and a device for supplying the fuel-to-air mixture to the engine.

Since the gas heat pump system uses a motive force of the engine, which is generated by combusting the fuel-to-air mixture, harmful substances contaminating the atmosphere are contained in exhaust gas generated in a process of combusting the fuel-to-air mixture.

Exhaust gas recirculation (EGR) technology in which a portion of the exhaust gas is resupplied to an intake line of the engine is generally employed as a means of reducing an amount of generated harmful substance contained in the exhaust gas.

Korean Patent Application Publication No. 10-2018-0015900 (Patent Document 1) discloses a turbocharger that rotates an impeller using a turbine, as a drive source, which is rotated with the exhaust gas, and an exhaust gas recirculation device that recirculates a portion of the exhaust discharged through the turbine to the intake line.

With a configuration disclosed in Patent Document 1, an amount of flowing recirculation exhaust gas is simply controlled only with an exhaust gas recirculation valve.

Therefore, in a case where pressure of the exhaust gas that is discharged and recirculated is lower than pressure of the intake line, recirculation is impossible.

In addition, with the configuration disclosed in Patent Document 1, an amount of the recirculation exhaust gas to be supplied cannot be controlled in a manner that corresponds to a concentration of harmful substances contained in the discharged exhaust gas or an amount of discharged substance. For this reason, the engine cannot be efficiently operated.

The foregoing is intended merely to aid in the understanding of the background of the present disclosure, and is not intended to mean that the present disclosure falls within the purview of the related art that is already known to those skilled in the art.

SUMMARY OF THE INVENTION

An objective of the present disclosure is to provide a gas heat-pump system capable of supplying recirculation exhaust gas using an exhaust gas turbocharger and thus actively controlling an amount of flowing recirculation exhaust gas and pressure thereof.

Another objective of the present disclosure is to provide a gas heat-pump system capable of monitoring in real time a concentration of harmful substances contained in discharged exhaust gas and controlling an amount of recirculation exhaust gas on the basis of a result of the monitoring. In the gas heat-pump system, an amount of generated harmful substance can be remarkably reduced and the operational efficiency of an engine can be improved.

According to an aspect of the present disclosure, there is provided a gas heat-pump system, including: a compressor of a conditioning module; a gas engine combusting a fuel-to-air mixture and thus generating a drive force of the compressor; an exhaust gas turbocharger supplying at least a portion of exhaust gas discharged from the gas engine, as recirculation exhaust gas, to the gas engine; and a controller controlling an amount of the recirculation exhaust to be supplied, wherein the exhaust gas turbocharger includes: a turbine rotated with the exhaust gas; and an exhaust gas impeller rotated along with the turbine, the exhaust gas impeller being configured to apply pressure to the recirculation exhaust gas and supply the resulting recirculation exhaust gas to the gas engine, and the controller controls an amount of the flowing exhaust gas to be supplied to the turbine according to a concentration of harmful substances contained in the exhaust gas.

The gas heat-pump system may further include: an exhaust pipe through which the exhaust gas is discharged to the outside of the gas heat-pump system; a first bypass pipe provided to branch off from the exhaust pipe, the first bypass pipe being configured to guide at least a portion of the exhaust gas to the turbine; a second bypass pipe provided to branch off from the exhaust pipe downstream from the first bypass pipe, the second bypass pipe being configured to guide at least a portion of the exhaust gas, as the recirculation exhaust gas, the exhaust gas impeller; and an exhaust bypass valve installed on the bypass pipe, the exhaust bypass valve being configured to control an amount of the flowing exhaust gas to be introduced into the first bypass pipe, wherein the controller may control the degree of opening to which the exhaust bypass is open and thus may control the amount of the flowing exhaust gas to be introduced into the first bypass pipe.

In the gas heat-pump system, the exhaust bypass valve may be arranged between an entrance portion of the first bypass pipe through which the exhaust gas is introduced, and an exit portion of the first bypass valve through which the introduced exhaust gas is discharged.

The gas heat-pump system may further include: an exhaust gas sensor arranged downstream from an entrance portion of the second bypass pipe, the exhaust gas sensor being configured to sense the concentration of the harmful substances contained in the exhaust gas, wherein the controller may receive a signal indicative of the concentration of the harmful substances from the exhaust gas sensor and may calculate the concentration of the harmful substances.

In the gas heat-pump system, the harmful substances may include at least one of carbon monoxide, nitrogen oxide, and hydrocarbon.

In the gas heat-pump system, the controller may compare the calculated concentration with a reference concentration and may determine whether or not the calculated concentration exceeds the reference concentration, and when it is determined that the calculated concentration is equal to or higher than the reference concentration, the controller may decrease the degree of opening to which the exhaust bypass valve is open and thus may increase the amount of the flowing exhaust gas to be introduced into the first bypass pipe.

In the gas heat-pump system, the controller may compute a current rpm of the gas engine and an amount of required load on the air conditioning module, may compute a total amount of the flowing exhaust gas discharged from the gas engine on the basis of at least one of the computed current rpm and the computed amount of the required load, and may set the degree of opening to which the exhaust bypass valve is open, on the basis of the total amount of the flowing exhaust gas.

The gas heat-pump system may further include: a turbocharger applying pressure to the fuel-to-air mixture and supplying the resulting fuel-to-air mixture to the gas engine, wherein the controller may compute a current rpm of the gas engine, an amount of required load on the air conditioning module, and an rpm of the turbocharger, may compute a total amount of the flowing exhaust gas discharged from the gas engine on the basis of one of the computed current rpm, the computed amount of the required load, and the computed rpm of the turbocharger, and may set the degree of opening to which the exhaust bypass valve is open, on the basis of the total amount of the flowing exhaust gas.

The gas heat-pump system may further include: an intake manifold supplying the fuel-to-air mixture to the gas engine; an intake manifold pressure sensor sensing pressure of the fuel-to-air mixture within the intake manifold; and a recirculation exhaust gas pressure sensor sensing turbocharger pressure of the recirculation exhaust gas discharged from the exhaust gas turbocharger, wherein the controller may receive a signal indicative of the pressure of the fuel-to-air mixture from the intake manifold pressure sensor and may calculate the pressure of the fuel-to-air mixture, and the controller may receive a signal indicative of pressure of the recirculation exhaust gas from the recirculation exhaust gas pressure sensor and may calculate the turbocharger pressure of the recirculation exhaust gas to be supplied to the intake manifold.

In the gas heat-pump system, the controller may compute a pressure difference between the calculated pressure of the fuel-to-air mixture and the calculated turbocharger pressure of the recirculation exhaust gas, and may determine whether or not the pressure difference exceeds a predetermined reference pressure difference.

In the gas heat-pump system, when it is determined that the pressure difference is equal to or higher than the predetermined reference pressure difference, the controller may maintain the degree of opening to which the exhaust bypass valve is open.

In the gas heat-pump system, when it is determined that the pressure difference is lower than the predetermined reference pressure difference, the controller may decrease the degree of opening to which the exhaust bypass valve is open, at a predetermined ratio.

The gas heat-pump system may further include: an exhaust gas heat exchanger installed on the exhaust pipe in a manner that is arranged between an exit portion of the first bypass pipe and an entrance portion of the second bypass pipe.

The gas heat-pump system may further include: a check valve installed on an exit portion of the second bypass pipe, the check valve being configured to block the fuel-to-air mixture from flowing in a reverse direction from the gas engine to the second bypass pipe.

The gas heat-pump system according to the present disclosure supplies the recirculation exhaust gas using the exhaust gas turbocharger. Thus, the advantage of actively controlling the amount of the flowing recirculation exhaust gas and the pressure thereof can be achieved.

Furthermore, in the gas heat-pump system according to the present disclosure, the concentration of the harmful substances contained in the discharged exhaust gas is monitored in real time, and the amount of the recirculation exhaust gas is controlled on the basis of a result of the monitoring. Thus, the advantage of remarkably reducing the amount of the generated harmful substance and improving the operational efficiency of the gas engine can be archived.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Exemplary embodiments of the present disclosure will be described in detail below with reference to the accompanying drawings.

Various modifications can be made to the present disclosure, and thus various embodiments can be implemented. The resulting specific embodiments will also be described in detail below with reference to the drawings. This description is not intended to limit the present disclosure to the specific embodiments. All alterations, equivalents, and substitutes that are included within the technical idea of the present disclosure should be construed as falling within the scope of the present disclosure.

The terms first and second, and so on are used to describe various constituent elements, but should not be construed as imposing any limitation on the various constituent elements. These terms are used only to distinguish one element from another. For example, a first constituent element may be expressed as a second constituent element without departing from the scope of the present disclosure. In the same manner, the second constituent element may also be expressed as the first constituent element.

The phrase "and/or" is used to join two words, phrases, and sentences or to refer to one of the two words, phrases, and sentences.

It should be understood that, when a constituent element is referred to as being "coupled to" or "connected to" a different constituent element, this means that the constituent element may be directly coupled to or directly connected to the different constituent element or means that an intervening constituent element may be present therebetween. In contrast, it should be understood that, when a constituent element is referred to as being "directly coupled to" or "directly connected to" a different constituent element, this means that no intervening constituent element is present therebetween.

The terms used in the present specification are only for describing specific embodiments and are not intended to impose any limitation on the present disclosure. The indefinite article "a/an" is used to mean "one or more", not only one, except as distinctively expressed in context.

The term "include," "have" or the like in the present application is intended to indicate that a feature, a number, a step, an operation, a constituent element, a component, or combinations of these, which is described in the specification, is present, and thus should be understood not to preclude in advance the possibility that one or more other features, numbers, steps, operations, constituent elements, components, or combinations of these will be present or added.

Unless otherwise defined, each of the terms, including technical and scientific terms, which are used in the present specification, has the same meaning as is normally understood by a person of ordinary skill in the art to which the present invention pertains. The term as defined in commonly used dictionaries should be construed as having the same meaning in context in the art and, unless otherwise explicitly defined in the present specification, is not construed as having an ideal meaning or an excessively-formal meaning.

The embodiments will be provided below for illustrative purpose to help a person of ordinary skill in the art to get a full understanding of the present disclosure, and shapes, sizes, and the like of elements in the drawings can be exaggerated for clearer description.

Figure 1:
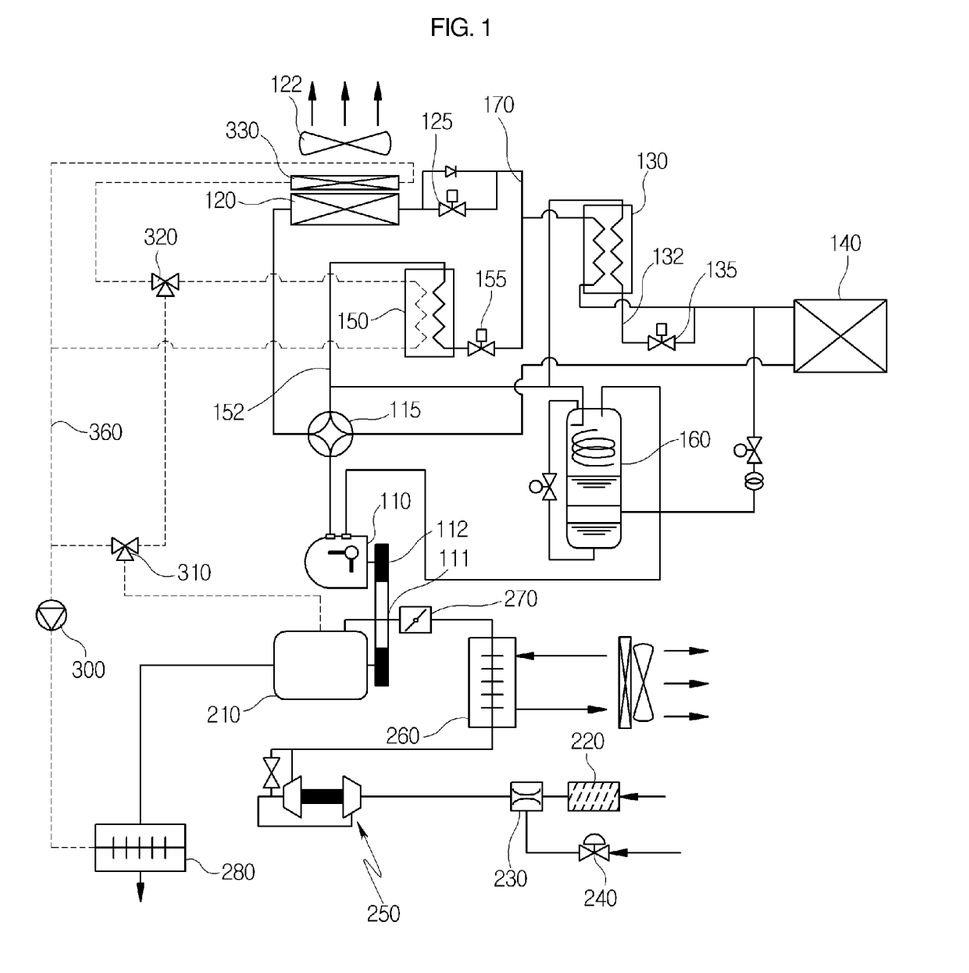
FIG. 1 is a view schematically illustrating a configuration of a gas heat-pump system according to an embodiment of the present disclosure.
Figure 2:
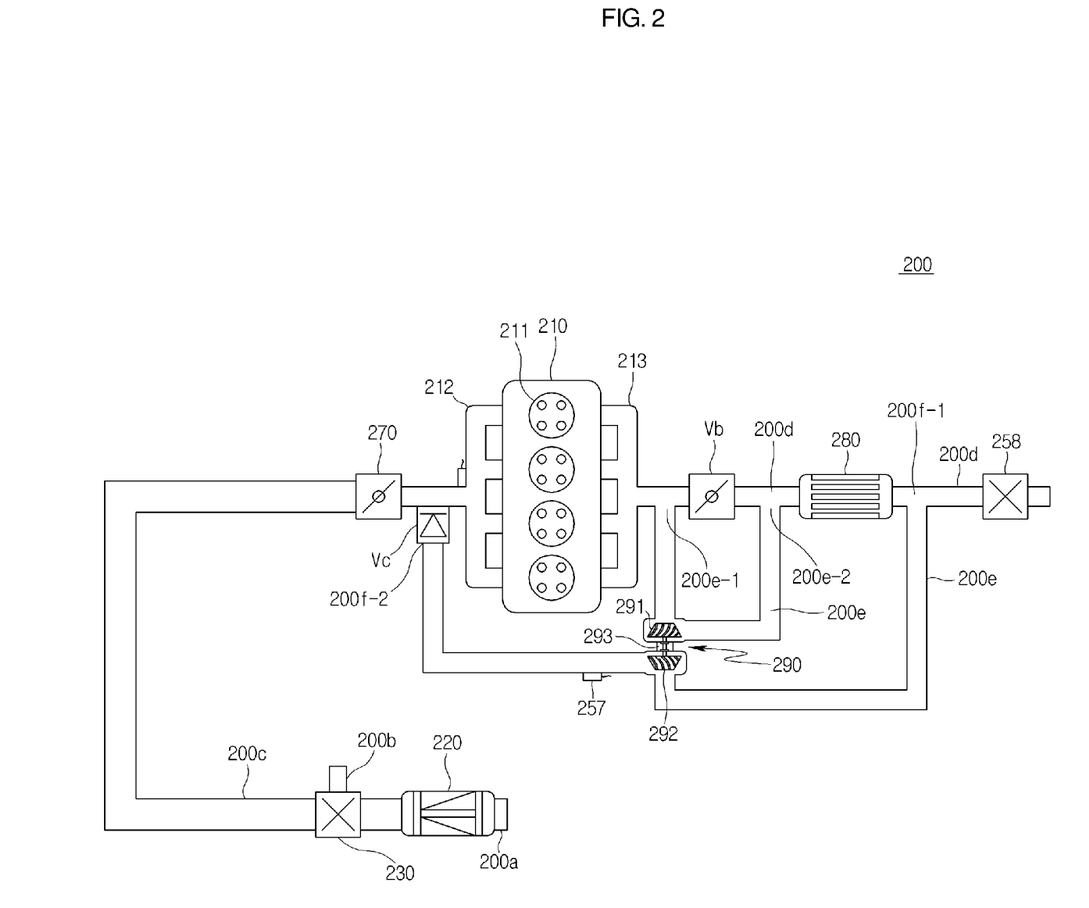
FIGS. 2 and 3 are views each schematically illustrating a detailed configuration of an engine module in FIG. 1.

FIG. 1 is a view schematically illustrating a configuration of a gas heat pump system according to an embodiment of the present disclosure. FIG. 2 is a view illustrating a detailed configuration of an engine module in FIG. 1.

With reference to FIG. 1, a gas heat pump system according to an embodiment of the present disclosure includes an air conditioning module, an engine module, and a cooling module.

The air conditioning module includes a plurality of components that are necessary for a refrigerant cycle.

For example, the air conditioning module includes a compressor 110 and a four-way valve 115. The compressor 110 compresses refrigerant. The four-way valve 115 switches a direction of the refrigerant compressed in the compressor 110.

The compressor 110 operates with a drive force generated by an engine 201 that will be described below, and serves to compress the refrigerant in a gaseous state and discharge the resulting refrigerant.

A pulley and clutch assembly 112 is provided on a drive shaft of the compressor 110. The drive force generated by the engine 210 is transferred to the compressor 110 through a belt 111 and the pulley and clutch assembly 112.

In FIG. 1, a configuration in which the air conditioning module includes one compressor 110 is illustrated, but the air conditioning module may include a plurality of compressors 110, depending on a load capacity of an indoor air conditioning condenser unit.

The plurality of compressors 110 each have the pulley and clutch assembly 112 to which the drive force generated by the engine 210 is selectively transferred.

Furthermore, the air conditioning module may further include an outdoor heat exchanger 120 and an indoor heat exchanger 140.

The outdoor heat exchanger 120 is arranged within an outdoor air conditioning condenser unit that is installed outdoors, and the indoor heat exchanger 140 is arranged within the indoor air conditioning condenser unit that is installed indoors.

The refrigerant that passes through the four-way valve 115 flows to the outdoor heat exchanger 120 or the indoor heat exchanger 140.

Components other than the indoor heat exchanger 140 and an indoor expansion device 145 of the gas heat-pump system 10, which are illustrated in FIG. 1, are arranged outdoors, that is, are arranged within the outdoor air conditioning condenser unit.

In a case where the gas heat system operates in a cooling operation mode, the refrigerant passing through the four-way valve 115 flows toward the indoor heat exchanger 140 through the outdoor heat exchanger 120.

In contrast, in a case where the gas heat system operates in a heating operation mode, the refrigerant passing through the four-way valve 115 flows toward the outdoor heat exchanger 120 through the indoor heat exchanger 140.

The air conditioning module may further include a refrigerant pipe 170 (a flow path indicated by a solid line) that connects the compressor 110, the outdoor heat exchanger 120, the indoor heat exchanger 140, and the like to each other and guides a flow of the refrigerant.

First, the configuration of the gas heat pump system operating in the cooling operation mode will be described below.

The refrigerant flowing to the outdoor heat exchanger 120 exchanges heat with outside air and thus is condensed. An outdoor fan 122 that blows the outside air into the outdoor heat exchanger 120 is arranged on one side thereof.

A main expansion device 125 for decompressing the refrigerant is provided to the exit side of the outdoor heat exchanger 120. For example, the main expansion device 125 may include an electronic expansion valve (EEV). The electronic expansion valve (EVV) is controlled using a pulse-width modulation method. In a case where a pulse increases (by a positive value), the degree of opening to which the main expansion device 125 is open is increased.

In a case where the pulse decreases (by a negative value), the degree of opening to which the main expansion device 125 is open is decreased.

When performing a cooling operation, the main expansion device 125 is fully open, and thus an operation of decompressing the refrigerant is not performed.

A supercooling heat exchanger 130 for additionally cooling the refrigerant is provided to the exit side of the main expansion device 125. Then, a supercooling flow path 132 is connected to the supercooling heat exchanger 130. The supercooling flow path 132 branches off from the refrigerant pipe 170 and is connected to the supercooling heat exchanger 130.

Then, a supercooling expansion device 135 is installed on the supercooling flow path 132. The refrigerant flowing along the supercooling flow path 132 is decompressed while passing through the supercooling expansion device 135.

In the supercooling heat exchanger 130, heat exchanger occurs between the refrigerant in the refrigerant pipe 170 and the refrigerant on the supercooling flow path 132. In a heat exchange process, the refrigerant in the refrigerant pipe 170 is supercooled, and the refrigerant on the supercooling flow path 132 absorbs heat.

The supercooling flow path 132 is connected to a gas-liquid separator 160. The refrigerant on the supercooling flow path 132, which exchanges heat in the supercooling heat exchanger 130, flows into the gas-liquid separator 160.

The refrigerant in the refrigerant pipe 170, which passes through the supercooling heat exchanger 130, flows toward the indoor air conditioning condenser unit, is decompressed in the indoor expansion device 145, and then evaporates in the indoor heat exchanger 140. The indoor expansion device 145 is installed within the indoor air conditioning condenser unit and is configured as the electronic expansion valve (EEV).

In addition, the refrigerant evaporating in the indoor heat exchanger 140 may pass through the four-way valve 115 and then may flow right into the gas-liquid separator 160. Gaseous-phase refrigerant, resulting from refrigerant separation, is absorbed into the compressor 110.

The configuration of the gas heat pump system operating in the heating operation mode will be described below.

In a heating process, the refrigerant compressed in the compressor 110 flows to the indoor heat exchanger 140, and the refrigerant condensed in the indoor heat exchanger 140 flows to an auxiliary heat exchanger 150. A refrigerant branch pipe 151 is connected to the auxiliary heat exchanger 150.

An expansion valve 152 is provided on a portion, positioned to the entrance side of the auxiliary heat exchanger 150, of the refrigerant branch pipe 151. The expansion valve 152 decompresses the refrigerant while controlling the flow of the refrigerant.

The auxiliary heat exchanger 150 is a heat exchanger in which heat exchange occurs between low pressure refrigerant and high temperature coolant. Examples of the auxiliary heat exchanger 150 include a plate-type heat exchanger.

The refrigerant passing through the auxiliary heat exchanger 150 may flow into the gas-liquid separator 160.

In the gas-liquid separator 160, the refrigerant passing through the auxiliary heat exchanger 150 is separated into gas and liquid. The gaseous-phase refrigerant, resulting from the refrigerant separation, is absorbed into the compressor 110.

The cooling module includes a coolant pipe 360 (a flow path indicated by a dotted line) that guides a flow of coolant for cooling the engine 210 that will be described below.

A coolant pump 300, a plurality of flow control valves 310 and 320, and a radiator 330 are installed on the coolant pipe 360. The coolant pump 300 generates a flow force of the coolant. The plurality of flow control valves 310 and 320 switch a flow direction of the coolant. The radiator 330 cools the coolant.

The plurality of flow control valves 310 and 320 include a first flow control valve 310 and a second flow control valve 320. As an example, a three-way may be used as each of the first flow control valve 310 and the second flow control valve 320.

The radiator 330 is positioned to one side of the outdoor heat exchanger 120. The coolant in the radiator 330 exchanges heat with the outside air by driving the outdoor fan 122 and, during this heat exchange process, is cooled.

When the coolant pump 300 is driven, the coolant passes through the engine 210 and an exhaust gas heat exchanger 280 and selectively flows into the radiator 330 or the auxiliary heat exchanger 150 through the first flow control valve 310 and the second flow control valve 320.

The engine module includes the engine 210 and various components for supplying a fuel-to-air mixture to the engine 210.

The engine module includes a mixer 230 that is arranged to the entrance side of the engine 210 and mixes air and gaseous fuel.

An air filter 220 and a zero governor 240 are installed upstream from the mixer 230. The air filter 220 supplies purified air to the mixer 230 through an air pipe 220a. The zero governor 240 supplies gaseous fuel at predetermined pressure or lower through a fuel pipe 200b.

The zero governor 240 is a device that uniformly controls output pressure regardless of a magnitude of entrance pressure of the gaseous fuel or a change in an amount of flow and supplies the resulting gaseous fuel.

In the mixer 230, the air passing through the air filter 220 and the gaseous fuel discharged from the zero governor 240 are mixed to generate the fuel-to-air mixture. The generated fuel-to-air mixture is supplied to the engine 210 through a mixture device 200c.

The engine module may further include a turbocharger 250 and a flow control unit 270 that are arranged between the mixer 230 and the engine 210.

The turbocharger 250 applies pressure to the fuel-to-air mixture to increase the density of the fuel-to-air mixture and supplies the resulting fuel-to-air mixture to the engine 210. The turbocharger 250 is used to provide a higher output than in a natural aspirated engine.

In FIG. 1, a natural aspirated-type engine module is illustrated. In FIG. 2, an engine module 200 including a turbocharger, which includes a motor 252 and an impeller 251 driven by the motor 252, is illustrated.

The flow control unit 270 is arranged between the turbocharger 250 and the engine 210 and controls an amount of the compressed fuel-to-air mixture that is to be supplied to the engine 210.

Examples of the flow control unit 270 include a valve that employs an electronic throttle control scheme (ETC). An embodiment in which the ETC valve capable of being electronically controlled is used as the flow control unit 270 will be described below. However, the present disclosure is not limited to this embodiment.

In this manner, the mixer 230 mixes gaseous fuel and air to generate the fuel-to-air mixture. The turbocharger 250 applies high pressure to the generated fuel-to-air mixture, and then the resulting fuel-to-air mixture is supplied to the engine 210.

At this point, an amount of the high pressure fuel-to-air mixture that is to be supplied to the engine 210 is precisely controlled with the ETC valve 270, and thus an output of the engine 210 is controlled.

As described above, the fuel-to-air mixture passing through the turbocharger 250 is in high temperature and high pressure states. For this reason, an intercooler 260 is provided between the turbocharger 250 and the flow control unit 270. The intercooler 260 lowers the temperature and pressure of the fuel-to-air mixture and supplies the resulting fuel-to-air mixture to a cylinder 211 of the engine 210.

For example, the intercooler 260 is configured in such a manner that heat exchange occurs between the fuel-to-air mixture to be supplied to the engine 210 and a portion of the coolant to flow to the engine 210 or in such a manner that, as illustrated in FIG. 2, heat exchange occurs between the coolant circulating through a separate coolant pump 261 in FIG. 2 and the fuel-to-air mixture.

The engine module may further include the exhaust gas heat exchanger 280 which is arranged to the exhaust outlet side of the engine 210 and in which heat exchanger occurs between the coolant and exhaust gas.

Figure 3:
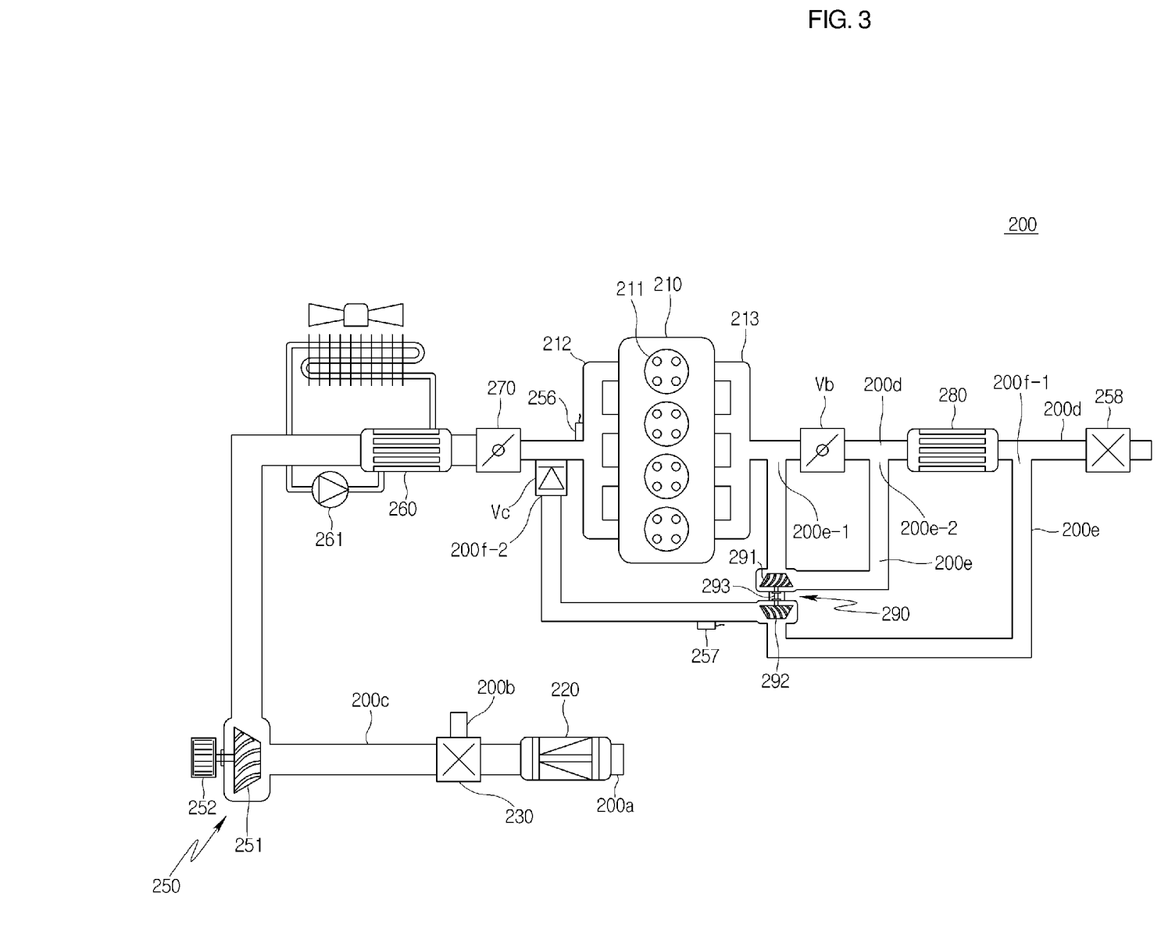

FIGS. 2 and 3 are views each schematically illustrating a detained configuration of the engine module 200 illustrated in FIG. 1.

The engine modules 200 in FIGS. 2 and 3 have the same configuration except that the engine module 200 illustrated in FIG. 3 further includes the turbocharger 250.

A detailed configuration of the engine module 200 according to an embodiment of the present disclosure will be described below with reference to FIG. 3 for convenience. However, the configuration illustrated in FIG. 2 also falls within the scope of the present disclosure, and the same descriptions are not repeated.

As illustrated in FIG. 3, the engine module 200 of the gas heat-pump system according to the present disclosure may further include an exhaust gas turbocharger 290 that supplies at least a portion of the exhaust gas discharged from the engine 210, as recirculation exhaust gas, to the engine 210.

The exhaust gas turbocharger 290 serves to apply pressure to at least a portion of the exhaust gas discharged to an exhaust pipe 200d through an exhaust manifold 213 and to supply the resulting portion thereof, as the recirculation exhaust gas, to an intake manifold 212.

The exhaust gas turbocharger 290 is configured in such a manner as to minimize power consumption.

More specifically, the exhaust gas turbocharger 290 includes a turbine 291 and an exhaust gas impeller 292. The turbine 291 is rotated with the exhaust gas. The exhaust gas impeller 292 is rotated along with the turbine 291, and applies pressure to the recirculation exhaust gas and then supplies the resulting recirculation exhaust gas to the engine 210.

The turbine 291 and the exhaust gas impeller 292 are connected to each other with a shaft 293 in such a manner that the turbine 291 and the exhaust gas impeller 292 are concurrently rotated.

The exhaust gas with which a rotational force of the turbine 291 is generated is supplied from a first bypass pipe 200e.

That is, as illustrated, the first bypass pipe 200e is provided in the form of a pipe branching off from the exhaust pipe 200d. An entrance portion 200e-1 and an exit portion 200e-2 of the first bypass pipe 200e are both connected to the exhaust pipe 200d. In this case, the entrance portion 200e-1 is provided upstream from the exit portion 200e-2 when viewed from a flowing direction of the exhaust gas.

Accordingly, at least a portion of the exhaust gas that flows after being discharged through the exhaust manifold 213 is introduced into the first bypass pipe 200e through the entrance portion 200e-1, and the introduced exhaust gas is used to generate the rotational force for the turbine 291 and then is discharged back to the exhaust pipe 200d through the exit portion 200e-2.

A second bypass pipe 200f is provided in the form of a pipe branching off from the exhaust pipe 200d downstream from the exit portion 200e-2 of the first bypass pipe 200e. The exhaust gas impeller 292 is rotatably arranged within the second bypass pipe 200f.

Accordingly, the exhaust gas impeller 292 applies pressure to a portion of the exhaust gas introduced through the second bypass pipe 200f, as recirculation exhaust gas, and then discharges the resulting portion of the recirculation exhaust gas toward the intake manifold 212 of the engine 210.

At this point, in order to lower the temperature of the recirculation exhaust gas and raise the density thereof, the exhaust gas heat exchanger 280 is desirably arranged between the exit portion 200e-2 of the first bypass pipe 200e and an entrance portion 200f-1 of the second bypass pipe 200f.

The reason for this arrangement is because the exhaust gas discharged from the exhaust manifold 213 normally has a temperature in the range of approximately 300 to 700° C. When the exhaust gas is supplied to the intake manifold 212 without being cooled, the density of the fuel-to-air mixture is decreased, thereby exerting an adverse effect on the efficiency of the engine 210.

Therefore, there is a need to sufficiently cool the exhaust gas for supply. To this end, the entrance portion 200f-1 of the second bypass pipe 200f is provided downstream from the exhaust gas heat exchanger 280 in such a manner as to supply the exhaust gas, as the recirculation exhaust gas, that is cooled to approximately 70° C. while passing through the exhaust gas heat exchanger 280.

As illustrated, in order to supply the recirculation exhaust gas, an exit portion 200f-2 of the second bypass pipe 200f is connected to the mixture device 200c or the intake manifold 212 in such a manner as to allow a fluid to pass through.

At this point, a turbocharge amount of the recirculation exhaust gas is actively controlled within a range of 3 to 30% of a total amount of the exhaust gas.

An exhaust bypass valve Vb with which an amount of the flowing exhaust gas to be supplied to the turbine 291 is controlled is provided as a mean for actively controlling the turbocharge amount of the recirculation exhaust gas.

As illustrated, the exhaust bypass valve Vb is arranged between the entrance portion 200e-1 and the exit portion 200e-2 of the first bypass pipe 200e and serves to control the amount of the exhaust gas flowing along the exhaust pipe 200d.

The exhaust bypass valve Vb is electrically connected to a controller 500. The degree of opening to which the exhaust bypass valve Vb is open is controlled in a control manner according to a control signal of the controller 500.

Accordingly, in a case where much more of the exhaust gas needs to be supplied to the turbine 291 of the exhaust gas turbocharger 290, the controller 500 decreases the degree of opening, and thus reduces the amount of the flowing exhaust gas passing through the exhaust pipe 200d and increases the amount of the flowing exhaust gas that is introduced through the entrance portion 200e-1 of the first bypass pipe 200e.

When much more of the exhaust gas is supplied in this manner to the turbine 291 of the exhaust gas turbocharger 290, an rpm of the turbine 291 and an rpm of the exhaust gas impeller 292 are increased. When the rpm of the exhaust gas impeller 292 is increased, the amount of the flowing recirculation exhaust gas and pressure thereof are also increased. That is, control is performed in such a manner as to increase the turbocharge amount of the recirculation exhaust gas.

Any arbitrary means known in the art, which is capable of being electrically connected to the controller 500 and thus being electronically controlled, may be used as the exhaust bypass valve Vb without restraint. This arbitrary means should fall within the scope of the present disclosure.

At this time point, the turbocharge amount of the recirculation exhaust gas, which is supplied to the intake manifold 212 through the exhaust gas turbocharger 290, is determined on the basis of a concentration of harmful substances within the exhaust pipe 200d.

Harmful substances contained in the exhaust gas are normally known to include carbon monoxide (CO), nitrogen oxide (NOx), and hydrocarbon (HC). According to the present disclosure, a configuration in which the turbocharge amount of the recirculation exhaust gas is controlled on the basis of a concentration of at least one of these harmful substances is employed.

To this end, an exhaust gas sensor 258 sensing a concentration of harmful substances contained in the exhaust gas is provided on the exhaust pipe 200d.

The exhaust gas sensor 258 has the purpose of sensing the concentration of the harmful substances contained in the exhaust gas finally discharged to the outside of the gas heat-pump system. For this reason, the exhaust gas sensor 258 is desirably arranged most downstream from the exhaust pipe 200d.

According to the present disclosure, any sensor that is configured to sense the concentration of the harmful substances contained in the exhaust gas may be provided as the exhaust gas sensor 258 without restraint. The application of this modification example should fall within the scope of the present disclosure.

A recirculation exhaust gas pressure sensor 257 is attached to an exit side of the exhaust gas turbocharger 290. The recirculation exhaust gas pressure sensor 257 senses in real time turbocharger pressure of the recirculation exhaust gas that is discharged from the exhaust gas turbocharger 290 and is supplied to the intake manifold 212.

Furthermore, an intake manifold pressure sensor 256, as normally known as a MAP sensor, is attached to the intake manifold 212. The intake manifold pressure sensor 256 senses in real time pressure of the fuel-to-air mixture that is supplied to the cylinder 211 of the engine 210.

With this configuration, the amount of the recirculation exhaust gas supplied through the exhaust gas turbocharger 290 is controlled with a pressure difference, as a variable, between turbocharger pressure sensed by the recirculation exhaust gas pressure sensor 257 and the pressure of the fuel-to-air mixture, which is sensed by the intake manifold pressure sensor 256.

That is, as will be described below, in a case where the turbocharge amount of the recirculation exhaust gas needs to be increased, the degree of opening to which the exhaust bypass valve Vb is open is decreased, and thus the amount of the flowing exhaust gas to be supplied to the turbine 291 of the exhaust gas turbocharger 290 is increased, thereby increasing the rpm of the exhaust gas impeller 292. That is, control is performed in such a manner as to increase the turbocharger pressure of the recirculation exhaust gas.

Conversely, in a case where the turbocharge amount of the recirculation exhaust gas needs to be decreased, the degree of opening to which the exhaust bypass valve Vb is open is increased. That is, control is performed in such a manner as to decrease the amount of the flowing exhaust gas to be supplied to the turbine 291 of the exhaust gas turbocharger 290.

However, in a case where the exhaust gas turbocharger 290 does not operate, there is a likelihood that the fuel-to-air mixture will be introduced into a reverse direction from the intake manifold 212 to the second bypass pipe 200f. In order to prevent this situation, a check valve Vc that blocks the fuel-to-air mixture from flowing in the reverse direction is installed on the exit portion 200f-2 of the second bypass pipe 200f.

Figure 4:
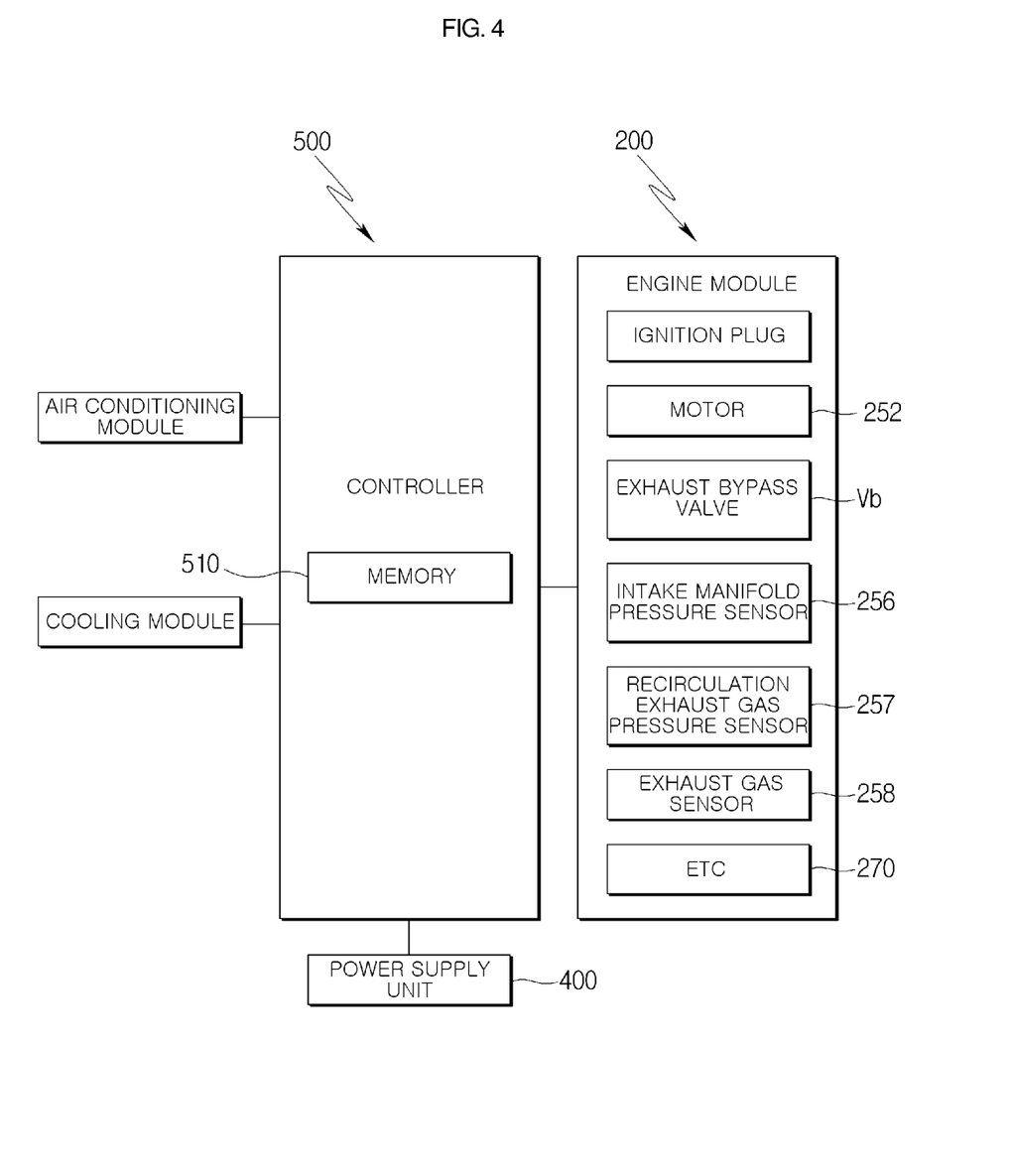
FIG. 4 is a functional block diagram illustrating a configuration of a controller of the gas heat-pump system according to the embodiment of the present disclosure.
Figure 5:
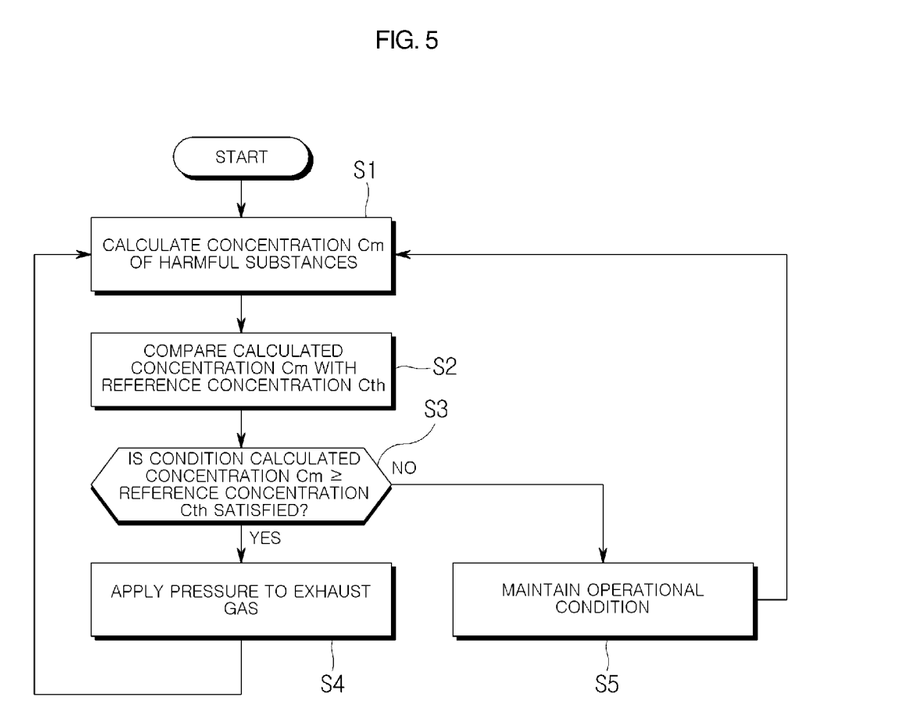
FIGS. 5 and 6 are flowcharts illustrating a method of controlling the gas heat-pump system according to an embodiment of the present disclosure.
Figure 6:
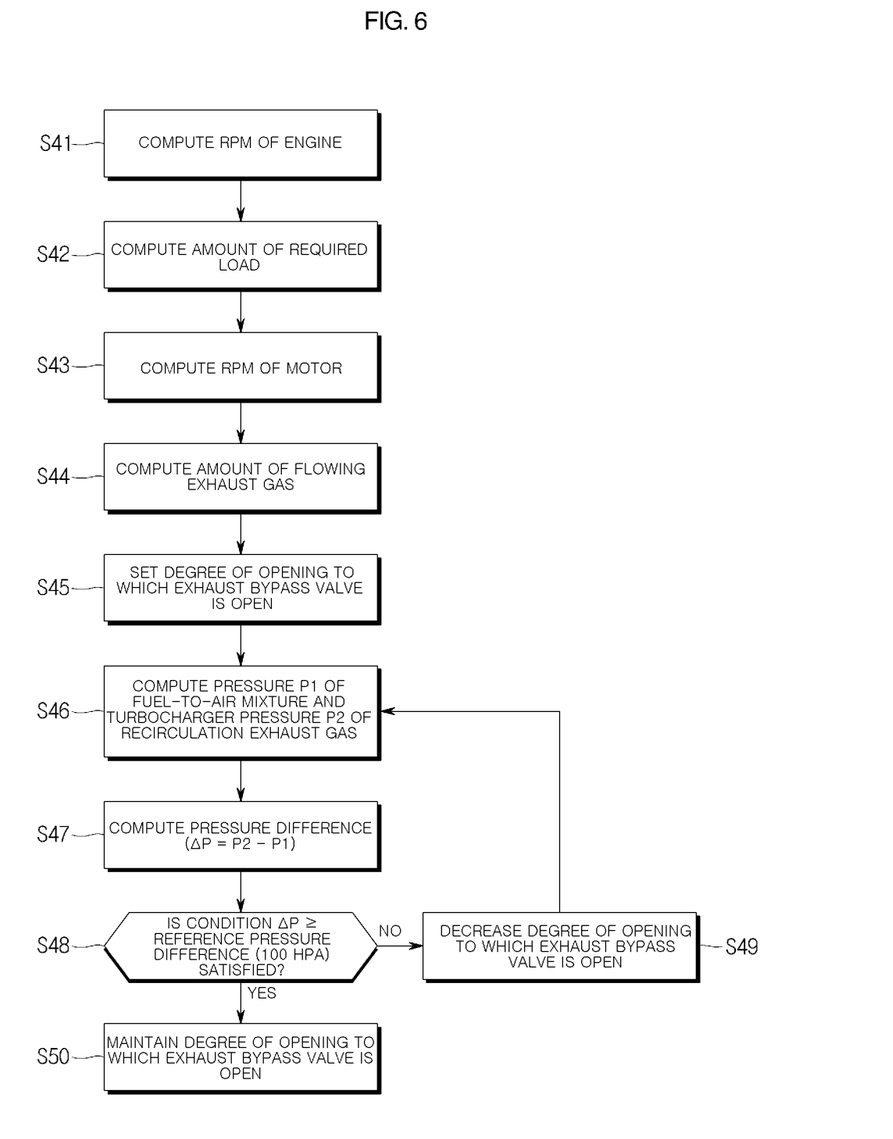

FIG. 4 is a functional block diagram illustrating a configuration of the controller 500 of the gas heat-pump system according to the embodiment of the present disclosure. FIGS. 5 and 6 are flowcharts illustrating a method of controlling the gas heat-pump system according to an embodiment of the present disclosure.

The method of controlling the gas heat-pump system according to the present disclosure will be described below with a focus on the controller 500.

As illustrated, the controller 500 is electrically connected to the air conditioning module, the cooling module, a power supply unit 400, and the engine module 200 and generates signals for controlling these components.

First, in a state where the gas heat-pump system is stopped, when a system operation signal is input through an operation unit that is not illustrated, the controller 500 generates signals for operating the air conditioning module, the cooling module, and the engine module 200, receives necessary electric power from the power supply unit 400, and supplies the received electric power to the air conditioning module, the cooling module, and the engine module 200.

A specific method and configuration in which the controller 500 controls the air conditioning module and the cooling module are known in the art, and therefore detailed descriptions thereof are omitted.

An operational condition for operating the engine module 200 is read from a memory 510. Specifically, control is performed in such a manner that the air pipe 200a and the fuel pipe 200b, which are described above, are open, and that air and fuel are thus introduced from the air pipe 200a and the fuel pipe 200b, respectively, and are mixed in the mixer 230.

In addition, in order to drive the turbocharger 250, the controller 500 performs control in such a manner that electric power is supplied to the motor 252.

When the fuel-to-air mixture to which pressure is applied is supplied to the engine 210, the controller 500 transmits an ignition signal to an ignition plug in accordance with a stroke of each cylinder 211 and ignites the fuel-to-air mixture supplied to each cylinder 211.

In a case where exhaust gas recirculation is needed, the rpm of the turbine 291 is controlled in such a manner as to decrease the degree of opening at which the exhaust bypass valve Vb is fully open.

As will be described below, the controller 500 controls, that is, increases or decrease, the degree of opening to which the exhaust bypass valve Vb is open, according to the concentration of the harmful substances contained in the exhaust gas.

In addition, the controller 500 is electrically connected to the intake manifold pressure sensor 256, the recirculation exhaust gas pressure sensor 257, and the exhaust gas sensor 258 and monitors in real time the pressure of the fuel-to-air mixture, the turbocharger pressure of the recirculation exhaust gas, the concentration of the harmful substances contained in the exhaust gas, and the like through electric signals received from these components.

In addition, the controller 500 is electrically connected to an actuator of the ETC valve 270. When the output of the engine 210 is increased or decreased, the actuator adjusts the degree of opening to which the ETC valve 270 is open, according to a control signal of the controller 500, and thus increases or decreases the output of the engine 210.

A specific process of controlling the engine module 200 will be described below with reference to FIGS. 5 and 6.

First, the controller 500 receives a signal indicative of the concentration of the harmful substances from the exhaust gas sensor 258 and calculates the concentration of the harmful substances (S1).

The harmful substances here include at least one of carbon monoxide, nitrogen oxide, and hydrocarbon. The exhaust gas sensor 258 generates an electric signal indicative of the concentration of these substances and transfers the generated electric signal to the controller 500. The controller 500 calculates the concentration of the harmful substances on the basis of the transferred electric signal.

Next, the controller 500 compares a calculated concentration Cm with a preset reference concentration Cth (S2).

The reference concentration Cth is secured by retrieving data that are stored in advance in the above-mentioned memory 510. The reference concentration Cth refers to a numerical value above which the concentration of the harmful substances contained in the exhaust gas falls out of an acceptable range and serves as a reference variable above which control for lowering an exhaust gas emission level needs to be performed.

Subsequently, the controller 500 determines whether or not the calculated concentration Cm exceeds the reference concentration Cth (S3).

When it is determined that the calculated concentration Cm is lower than the reference concentration Cth, the controller 500 determines that the concentration of the harmful substances falls within the acceptable range, and maintains a current operational condition (S4).

However, when it is determined that the calculated concentration Cm is equal to or higher than the reference concentration Cth, the controller 500 performs an exhaust gas turbocharger control step (S4).

More specifically, as illustrated in FIG. 6, first, the controller 500 computes a current rpm of the engine 210 and an amount of required load on the air conditioning module (S41 and S42).

In addition, the controller 500 computes a current rpm of the motor 252 of the turbocharger 250 (S43).

Next, the controller 500 computes a total amount of the flowing exhaust gas that is currently discharged from the engine 210, on the basis of at least one of the computed rpm of the engine 210, the computed amount of the required load on the air conditioning module, and the computed rpm of the motor 252 (S44).

In the case of a natural aspirated engine that is not equipped with the turbocharger 250, the total amount of the flowing exhaust gas is computed on the basis of the rpm of the engine 210 and the amount of the required load on the air conditioning module.

The total amount of the flowing exhaust gas is computed on the basis of the rpm of the engine 210, the amount of the required load on the air conditioning module, and the rpm of the motor 252 with reference to mapping data that are stored in advance in the above-mentioned memory 510.

When the total amount of the flowing exhaust gas from the engine 210 is computed in this manner, the controller 500 sets the degree of opening to which the exhaust bypass valve Vb is open, on the basis of the computed total amount of the flowing exhaust gas (S45).

The degree of opening to which the exhaust bypass valve Vb is open, which depends on the total amount of the flowing exhaust gas, is determined on the basis of the mapping data that are stored in advance in the above-mentioned memory 510.

When the degree of opening to which the exhaust bypass valve Vb is open is set in this manner to be decreased, the amount of the flowing exhaust gas that is introduced through the first bypass pipe 200e is increased, and an rpm of the exhaust gas turbocharger 290 and the rpm of the exhaust gas impeller 292 are accordingly increased.

The amount of the flowing recirculation exhaust gas to be supplied to the engine 210 and pressure of the recirculation exhaust are accordingly increased.

Next, the controller 500 receives a signal indicative of the pressure of the fuel-to-air mixture from the intake manifold pressure sensor 256 and calculates pressure P1 of the fuel-to-air mixture. Then, the controller 500 receives a signal indicative of the pressure of the recirculation exhaust gas from the recirculation exhaust gas pressure sensor 257 and calculates turbocharger pressure P2 of the recirculation exhaust gas that is supplied from the intake manifold 212 (S46).

Subsequently, the controller 500 computes a pressure difference ($\Delta P = P2 - P1$) that corresponds to a difference in value between the calculated pressure P1 of the fuel-to-air mixture and the calculated turbocharger pressure P2 (S73).

When the pressure difference $\Delta P$ is computed, the controller 500 determined whether or not the pressure difference $\Delta P$ exceeds a predetermined reference pressure difference (S48).

The predetermined reference pressure difference refers to a reference value that serves as a reference value for determining the turbocharge amount of the recirculation exhaust gas to be supplied to the intake manifold 212 of the engine 210. That is, when the pressure difference is higher than the reference pressure difference, it is determined that the recirculation exhaust gas is excessively supplied. Furthermore, when the pressure difference is lower than the reference pressure difference, it is determined that an amount of the supplied recirculation exhaust gas is insufficient.

The predetermined reference pressure difference here is desirably 100 hPa.

When it is determined that the pressure difference is equal to or higher than the predetermined reference pressure difference, the controller 500 determines that the turbocharge amount of the recirculation exhaust gas is suitable, and maintains a current degree of opening to which the exhaust bypass valve Vb is open (S49).

When the current degree of opening to which the exhaust bypass valve Vb is open is completely maintained, the controller 500 returns to Step S1 and again preforms Step S1 and steps subsequent thereto.

When it is determined that the pressure difference is lower than the predetermined reference pressure difference, the controller 500 decreases the degree of opening to which the exhaust bypass valve Vb is open, at a predetermined ratio (S49).

That is, since the turbocharge amount of the recirculation exhaust gas that is currently supplied to the engine 210 is insufficient, there is a need to increase the rpm of the turbine 291 of the exhaust gas turbocharger 290 and the rpm of the exhaust gas impeller 292. To this end, the degree of opening to which the exhaust bypass valve Vb is open is additionally decreased, and the amount of the flowing exhaust gas to be supplied to the turbine 291 is accordingly increased.

The predetermined ratio is desirably 5 to 10% of the current degree of opening.

When the degree of opening to which the exhaust bypass valve Vb is open is additionally decreased in this manner in Step S49, the controller 500 returns to Step S46 and again determines whether or not the pressure difference ΔP exceeds the predetermined reference pressure difference.

Accordingly, from the above-described technical configurations of the embodiments of the present disclosure, it would be apparent to a person of ordinary skill to which the present disclosure pertains that specific embodiments other than the above-described embodiment of the present disclosure will be implemented without departing the technical idea and necessary features of the present disclosure.

Therefore, it should be understood that the above-described embodiments are illustrative and non-restrictive in all respects. The scope of the present disclosure is defined in the following claims rather than the detailed description provided above. All alterations, modifications, and the like that are derived from the following claims and equivalents thereof should be interpreted as being included within the scope of the present disclosure.

What is claimed is:

1. A gas heat-pump system, comprising:
a compressor of a conditioning module;
a gas engine combusting a fuel-to-air mixture and thus generating a drive force of the compressor;
an exhaust gas turbocharger supplying at least a portion of exhaust gas discharged from the gas engine, as recirculation exhaust gas, to the gas engine; and
a controller controlling an amount of the recirculation exhaust to be supplied,
wherein the exhaust gas turbocharger comprises:
a turbine rotated with the exhaust gas; and
an exhaust gas impeller rotated along with the turbine, the exhaust gas impeller being configured to apply pressure to the recirculation exhaust gas and supply the resulting recirculation exhaust gas to the gas engine, and
the controller controls an amount of the flowing exhaust gas to be supplied to the turbine according to a concentration of harmful substances contained in the exhaust gas.

2. The gas heat-pump system of claim 1, further comprising:
an exhaust pipe through which the exhaust gas is discharged to the outside of the gas heat-pump system;
a first bypass pipe provided to branch off from the exhaust pipe, the first bypass pipe being configured to guide at least a portion of the exhaust gas to the turbine;
a second bypass pipe provided to branch off from the exhaust pipe downstream from the first bypass pipe, the second bypass pipe being configured to guide at least a portion of the exhaust gas, as the recirculation exhaust gas, to the exhaust gas impeller; and
an exhaust bypass valve installed on the bypass pipe, the exhaust bypass valve being configured to control an amount of the flowing exhaust gas to be introduced into the first bypass pipe,
wherein the controller controls the degree of opening to which the exhaust bypass is open and thus controls the amount of the flowing exhaust gas to be introduced into the first bypass pipe.

3. The gas heat-pump system of claim 2, wherein the exhaust bypass valve is arranged between an entrance portion of the first bypass pipe through which the exhaust gas is introduced, and an exit portion of the first bypass valve through which the introduced exhaust gas is discharged.

4. The gas heat-pump system of claim 3, further comprising:
an exhaust gas heat exchanger installed on the exhaust pipe in a manner that is arranged between the exit portion of the first bypass pipe and an entrance portion of the second bypass pipe.

5. The gas heat-pump system of claim 3, further comprising:
a check valve installed on an exit portion of the second bypass pipe, the check valve being configured to block the fuel-to-air mixture from flowing in a reverse direction from the gas engine to the second bypass pipe.

6. The gas heat-pump system of claim 2, further comprising:
an exhaust gas sensor arranged downstream from an entrance portion of the second bypass pipe, the exhaust gas sensor being configured to sense the concentration of the harmful substances contained in the exhaust gas,
wherein the controller receives a signal indicative of the concentration of the harmful substances from the exhaust gas sensor and calculates the concentration of the harmful substances.

7. The gas heat-pump system of claim 6, wherein the harmful substances comprise at least one of carbon monoxide, nitrogen oxide, and hydrocarbon.

8. The gas heat-pump system of claim 6, wherein the controller compares the calculated concentration with a reference concentration and determines whether or not the calculated concentration exceeds the reference concentration, and
when it is determined that the calculated concentration is equal to or higher than the reference concentration, the controller decreases the degree of opening to which the exhaust bypass valve is open and thus increases the amount of the flowing exhaust gas to be introduced into the first bypass pipe.

9. The gas heat-pump system of claim 8, further comprising:
a turbocharger applying pressure to the fuel-to-air mixture and supplying the resulting fuel-to-air mixture to the gas engine,
wherein the controller computes a current rpm of the gas engine, an amount of required load on the air conditioning module, and an rpm of the turbocharger, computes a total amount of the flowing exhaust gas discharged from the gas engine on the basis of one of the computed current rpm of the gas engine, the computed amount of the required load, and the computed rpm of the turbocharger, and sets the degree of opening to which the exhaust bypass valve is open, on the basis of the total amount of the flowing exhaust gas.

10. The gas heat-pump system of claim 8, wherein the controller computes a current rpm of the gas engine and an amount of required load on the air conditioning module, computes a total amount of the flowing exhaust gas discharged from the gas engine on the basis of at least one of the computed current rpm and the computed amount of the required load, and sets the degree of opening to which the exhaust bypass valve is open, on the basis of the total amount of the flowing exhaust gas.

11. The gas heat-pump system of claim 10, further comprising:
an intake manifold supplying the fuel-to-air mixture to the gas engine;
an intake manifold pressure sensor sensing pressure of the fuel-to-air mixture within the intake manifold; and
a recirculation exhaust gas pressure sensor sensing turbocharger pressure of the recirculation exhaust gas discharged from the exhaust gas turbocharger,
wherein the controller receives a signal indicative of the pressure of the fuel-to-air mixture from the intake manifold pressure sensor and calculates the pressure of the fuel-to-air mixture, and
the controller receives a signal indicative of pressure of the recirculation exhaust gas from the recirculation exhaust gas pressure sensor and calculates the turbocharger pressure of the recirculation exhaust gas to be supplied to the intake manifold.

12. The gas heat-pump system of claim 11, wherein the controller computes a pressure difference between the calculated pressure of the fuel-to-air mixture and the calculated turbocharger pressure of the recirculation exhaust gas, and determines whether or not the pressure difference exceeds a predetermined reference pressure difference.

13. The gas heat-pump system of claim 12, wherein when it is determined that the pressure difference is equal to or higher than the predetermined reference pressure difference, the controller maintains the degree of opening to which the exhaust bypass valve is open.

14. The gas heat-pump system of claim 12, wherein when it is determined that the pressure difference is lower than the predetermined reference pressure difference, the controller decreases the degree of opening to which the exhaust bypass valve is open, at a predetermined ratio.

* * * * *